C. F. HAMILTON.
LAWN RAKE.
APPLICATION FILED JULY 10, 1922.
1,430,227. Patented Sept. 26, 1922.
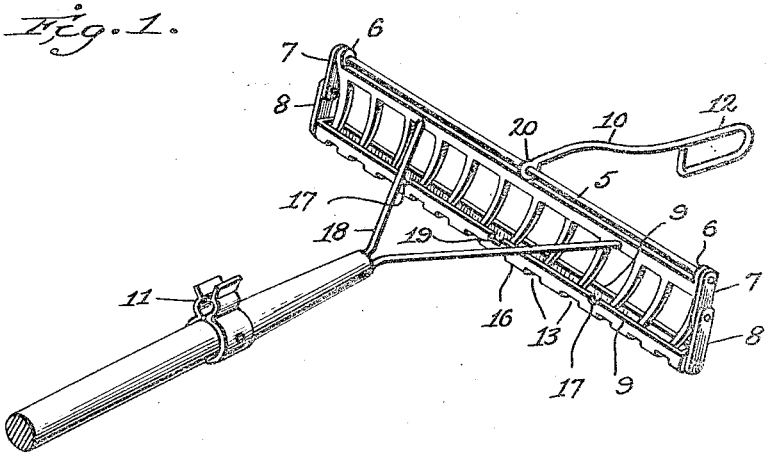
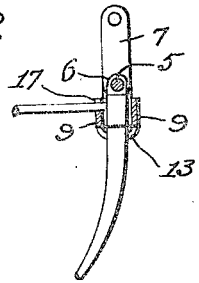
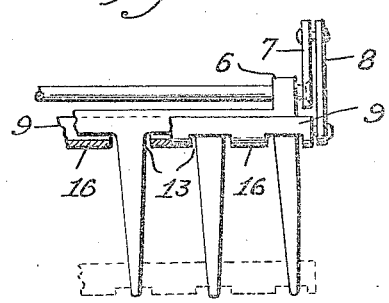
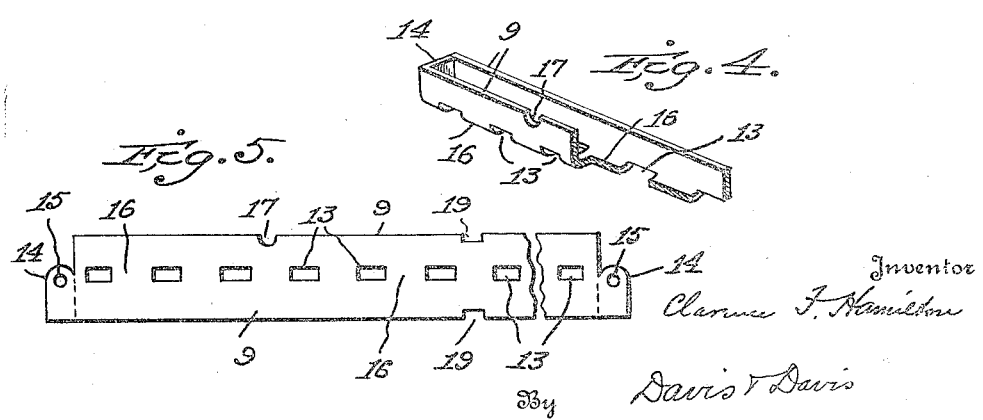
Inventor
Clarence F. Hamilton
By Davis & Davis
Attorneys Patented Sept. 26, 1922.

1,430,227

UNITED STATES PATENT OFFICE.

CLARENCE F. HAMILTON, OF PERU, INDIANA, ASSIGNOR OF ONE-HALF TO CHARLES W. GIPSON, OF PERU, INDIANA.

LAWN RAKE.

Application filed July 10, 1922. Serial No. 573,960.

*To all whom it may concern:*

Be it known that I, CLARENCE F. HAMILTON, a citizen of the United States of America, and a resident of Peru, county of Miami, and State of Indiana, have invented certain new and useful Improvements in Lawn Rakes, of which the following is a full and clear specification.

The object of this invention is to provide a well-known type of lawn rake with a simple attachment whereby grass, leaves, etc., which become lodged between the teeth of the rake may be quickly dislodged therefrom at the will of the user of the rake, as more fully hereinafter set forth.

In the drawing—

Fig. 1 is a perspective view showing the stripper as it appears after an operation;

Fig. 2 is a vertical section taken through the rake-head;

Fig. 3 is a rear elevation of a part of the rake-head, a part of the stripper being in section;

Fig. 4 is a perspective view of a part of the stripper;

Fig. 5 is a plan of the blank from which the stripper is stamped or bent up.

Referring to the drawings annexed by reference-numerals, 5 designates a rock-shaft journaled in lugs 6 affixed to the top-bar of the usual rake-head, the shaft being long enough to have its ends extend slightly beyond the ends of the rake-head. Affixed to each projecting end of this shaft is a flat arm 7 which extends radially from the shaft. Each arm 7 is pivotally connected to a companion flat link 8, and the free ends of the two links 8 are pivotally connected together by means of a stripper or clearer, which consists of a pair of bars 9, one lying close to the front-face of the rake-head and the other lying close to the rear-face thereof, these bars being practically the same length as the rock-shaft, so as to extend the full length of the rake-head. Affixed to the rock-shaft, at a point midway its length, is a lever 10 which is adapted to be temporarily locked to the handle of the rake by means of a clasp 11 affixed to the handle.

The parts are so arranged that when the lever 10 is in the clasp 11, the arms 7 and 8 will extend upwardly from the rake-head in overlapped relation, and the stripper-bars 9 will lie close to and parallel with the top-bar of the rake-head. In this position, the rake is adapted to be used in the ordinary manner without interference from the clearer-bars 9. When masses of grass, etc., become wedged in between the teeth and the rake is thereby rendered inefficient, to dislodge these masses of grass, etc., it is simply necessary to disconnect the handle-lever 10 from the clasp and swing it over backwardly, whereupon the arms 7—8 force the stripper-bars downwardly toward the end of the rake-teeth, thereby dislodging the masses between the teeth. The device operates with great ease in view of the leverage that may be exerted by means of the handle-lever 10 and also because of the fact that the stripper-bars 9 lie close to both faces of the teeth, so as to thereby engage the lodged masses in the most effective manner. The hand-lever 10 is preferably provided with a hand-loop 12 at its free end for convenience in operating it.

I prefer stamping up the stripper from a strip of sheet-metal, the blank for which is shown in Fig. 5. The strip of sheet-metal is provided with a series of holes 13 on a central longitudinal line, and the strip is folded upon itself along this central line to form a channel-iron, the ends of which channel are closed by ears 14 bent up from the ends of the strip of metal, these end-walls 14 being provided with holes 15 for the reception of the pivots at the lower ends of the links 8. The holes 13 are for the passage of the rake-teeth, and the web portions 16 between these holes lie between the teeth of the rake. When in position, the bar-portions 9 of the channel-iron lie respectively at the front and the rear of the top-bar of the rake-head, and the connecting members 16 lie close under said top-bar. In this way, the device is rendered very compact and is capable of being made with a minimum weight so as to thereby avoid materially increasing the labor of operating the rake. It is desirable also that the parts shall be prevented from rattling while the rake is being used; to ensure this, I provide the upper edges of the front-bar with notches 17 which embrace the shank-rods 18 of the rake and thus lock the stripper against endwise play. It will be noted also that the upper edge of the front as well as the rear bar 9 is provided with a notch 19, which notches engage the eye 20 of the lever, to thus further ensure against endwise vibration of the stripper.

The nature and scope of the invention having been thus indicated and its preferred embodiment having been specifically described, what is claimed is:

1. In combination with a lawn rake, a rock-shaft journaled on the top-bar of the rake-head, a lever connected to this rock-shaft, means for detachably holding the lever against the rake-handle, and means whereby when said lever is disconnected from the rake-handle and swung over backwardly the teeth of the rake will be cleared of rubbish, etc.

2. In combination with a lawn rake, a rock-shaft journaled on the top-bar of the rake-head, a lever connected to this rock-shaft, means for detachably holding the lever against the rake-handle, and means whereby when said lever is disconnected from the rake-handle and swung over backwardly the teeth of the rake will be cleared of rubbish, etc., said means embodying a pair of pivoted arms and a stripper-bar extending the length of the rake close to the teeth.

3. In combination with a lawn rake, a rock-shaft journaled on the top-bar of the rake-head, a lever connected to this rock-shaft, means for detachably holding the lever against the rake-handle, and means whereby when said lever is disconnected from the rake-handle and swung over backwardly the teeth of the rake will be cleared of rubbish, etc., said means consisting of a pair of stripper-bars embracing the teeth and two pairs of pivoted arms connecting the stripper-bars to the adjacent ends of the rock-shaft.

4. In combination with a lawn rake, a rock-shaft journaled on the top-bar of the rake-head and lying immediately above the same and parallel therewith, a stripper, a pair of links connecting each end of the rock-shaft to each end of the stripper and adapted when the stripper is in non-use position to overlie each other and project upwardly, and a lever affixed to the rock-shaft and adapted to be temporarily held to the handle of the rake, for the purpose set forth.

5. In combination with a lawn-rake, a stripper consisting of a channel-iron provided with openings for the teeth and forming a front and a rear bar, and means mounted on the rake-head for operating said stripper, the upper edge of one of said bars being notched to engage a part of the rake to lock the bars against lateral vibration.

In testimony whereof I hereunto affix my signature.

CLARENCE F. HAMILTON.

Witnesses:
CHARLES W. GIPSON,
JESSE WORDEN.